(12) United States Patent
Case et al.

(10) Patent No.: US 10,402,946 B2
(45) Date of Patent: Sep. 3, 2019

(54) SYSTEM AND METHOD FOR PERFORMING ORTHOGONAL ROTATION AND MIRRORING OPERATION IN A DEVICE

(71) Applicant: Lexmark International, Inc., Lexington, KY (US)

(72) Inventors: Christopher Wilson Case, Georgetown, KY (US); Brian Allen Craw, Lexington, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 101 days.

(21) Appl. No.: 14/885,669

(22) Filed: Oct. 16, 2015

(65) Prior Publication Data

US 2016/0275650 A1 Sep. 22, 2016

Related U.S. Application Data

(60) Provisional application No. 62/134,536, filed on Mar. 17, 2015.

(51) Int. Cl.
*G06T 3/60* (2006.01)

(52) U.S. Cl.
CPC ..... *G06T 3/606* (2013.01); *G09G 2340/0492* (2013.01)

(58) Field of Classification Search
None
See application file for complete search history.

(56) References Cited

U.S. PATENT DOCUMENTS

| 4,052,699 A * | 10/1977 | Micka | G06K 9/20 345/658 |
|---|---|---|---|
| 2015/0324955 A1* | 11/2015 | Cawley | H04N 1/387 345/649 |

* cited by examiner

*Primary Examiner* — Xin Sheng

(57) ABSTRACT

A system including a rotate block including an array of bit storage units for storing image data bits of a subtile of an image to be rotated, the image data bits of the subtile being arranged in a plurality of subtile rows. The rotate block is operative to load the image data bits of each subtile row of the subtile into the array according to a subtile row load direction that is selected from a plurality of load directions based at least upon a rotate operation to be performed on the image. After loading all the image data bits of the subtile into the array, the rotate block repeatedly unloads image data bits out of the array to produce a rotated subtile. The image data bits that are unloaded from the array from each unloading operation form a subtile row of the rotated subtile.

2 Claims, 14 Drawing Sheets

SYSTEM AND METHOD FOR PERFORMING ORTHOGONAL ROTATION AND MIRRORING OPERATION IN A DEVICE

CROSS REFERENCES TO RELATED APPLICATIONS

The present application is related to and claims priority under 35 U.S.C. 119(e) from U.S. provisional application No. 62/134,536, filed Mar. 17, 2015, entitled, "Method for Performing a Combined Orthogonal Rotation and Mirroring in an Imaging Device," the content of which is hereby incorporated by reference herein in its entirety.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Disclosure

The present disclosure relates generally to processing image data, more particularly, to systems and methods for performing orthogonal rotation, mirroring, or combinations thereof on an image.

2. Description of the Related Art

Many graphics systems have been designed and implemented to manipulate images for printing or display. In imaging devices such as printers, for example, typical image manipulation functions include mirroring, orthogonal rotation, or combinations thereof. Image mirroring involves symmetrically reflecting an image about an axis, such as the horizontal or vertical axis. On the other hand, orthogonal image rotation involves rotating an image orthogonally about the x-axis or y-axis. In the past, rotation and/or mirroring have been carried out using software which offers more flexibility. However, rotation and/or mirroring algorithms in software are not very efficient due to the extensive bit calculations in a processor, and high amount of memory accesses to small non-contiguous portions of memory. As a result, some imaging devices have been equipped with rotate hardware assist blocks in their SoCs (System on a Chip) that could not only perform the functions previously done in software at faster speeds but also offload or free up the processor to do more complicated and less repetitive tasks.

Some existing rotate hardware block designs, however, typically require relatively large gate counts in order to logically operate and combine complex functions to perform rotation and/or mirroring which increases overall system cost. Meanwhile, other hardware implementations are able to provide high throughput but with more limited flexibility. For example, some rotate block designs operate by reading words of image data from a memory buffer. The larger the bit-depth of the image data, the better the throughput would be as more bits of each word would be used in every clock to generate output data. For instance, if the image data is 8 bits-per-pixel (bpp), then 8 bits are used for every word read from the input buffer, and a couple of clock cycles are needed to read a number of words from the memory buffer in order to process all image data bits and generate a rotated image. However, if a low bit-depth was used, then only a portion of a word is used to generate output data. For instance, if the image data is 1 bpp, then only a single bit is used for every word read from the memory buffer to generate output data. Thus, it could take additional clock cycles as more read operations from the memory buffer are required in order to process all the image data bits of the image and generate a rotated image.

While these example approaches have to some extent been successful in terms of providing more efficiency than using software when performing mirroring and rotation functions, hardware graphics systems with even higher performance, more flexibility, and lower cost are still desired.

SUMMARY

Embodiments of the present disclosure provide systems and methods that combine relatively simple functions to perform rotation and/or mirroring on an image. In one example embodiment, a system includes a rotate block including an array of bit storage units for storing image data bits of a subtile of an image to be rotated, the image data bits of the subtile being arranged in a plurality of subtile rows. The rotate block is operative to load the image data bits of each subtile row of the subtile into the array according to a subtile row load direction that is selected from a plurality of load directions based at least upon a rotate operation to be performed on the image, and repeatedly unload image data bits out of the array to produce a rotated subtile. The image data bits that are unloaded from the array from each unloading operation form a subtile row of the rotated subtile.

In another example embodiment, an integrated circuit includes a rotate block for receiving a tile of image data of an image. The rotate block includes array circuitry configured to store image data bits of a plurality of subtile rows of a subtile of the tile. An order in which the subtile rows of the subtile are loaded into the array circuitry is defined based at least upon a rotate operation to be performed on the image. After the image data bits of each of the plurality of subtile rows are loaded into the array circuitry, a number of image data bits in the array circuitry is repeatedly unloaded from the array circuitry until all the image data bits therein are unloaded from the array circuitry. An output of the array circuitry produces a rotated subtile and the number of image data bits that are unloaded from the array circuitry from each unload operation forms a subtile row of the rotated subtile.

In another example embodiment, a method for rotating an image stored in memory includes sequentially loading image data bits of each subtile row of a plurality of subtile rows of a subtile of the image into an array of bit storage units according to a subtile row load direction. The subtile row load direction is selected from a plurality of load directions based upon at least one of a rotate operation and a mirror operation to be performed on the image. The method further includes, upon loading the image data bits of the plurality of subtile rows of the subtile into the array, repeatedly unloading a number of image data bits out of the array until all the image data bits therein are unloaded from the array to produce a rotated subtile. The number of image data bits that are unloaded from the array from each unload operation forms one subtile row of the rotated subtile.

BRIEF DESCRIPTION OF THE DRAWINGS

The above-mentioned and other features and advantages of the disclosed example embodiments, and the manner of attaining them, will become more apparent and will be better understood by reference to the following description of the disclosed example embodiments in conjunction with the accompanying drawings, wherein:

FIGS. 7A-7F illustrate subtile processing orders in which subtiles are processed to achieve desired mirrored and/or rotated images for the rotate and/or mirroring operations in FIGS. 4A-4F, respectively, according to an example embodiment

DETAILED DESCRIPTION

Figure 1:
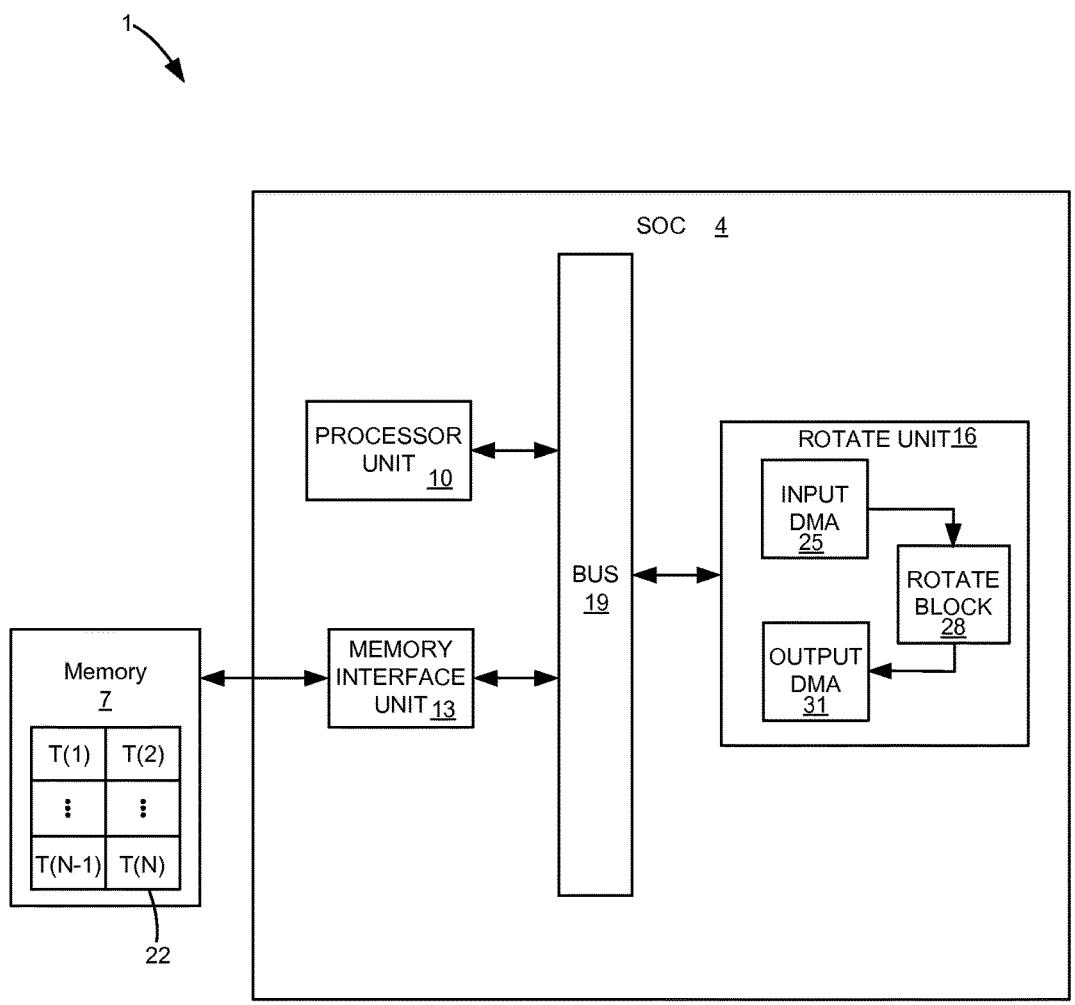
FIG. 1 illustrates a block diagram of an image processing system including an SoC and an associated memory, according to an example embodiment.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Spatially relative terms such as "top", "bottom", "left", "right", "above", "below", "up", "down", and the like, are used for ease of description to explain the location of an element relative to other elements in the example illustrations, and it is understood that relative element locations may vary from the locations described and depicted herein. Terms such as "first", "second", and the like, are used to describe various elements, regions, sections, etc. and are not intended to be limiting. Further, the terms "a" and "an" herein do not denote a limitation of quantity, but rather denote the presence of at least one of the referenced item.

Furthermore, and as described in subsequent paragraphs, the specific configurations illustrated in the drawings are intended to exemplify embodiments of the disclosure and that other alternative configurations are possible.

Reference will now be made in detail to the example embodiments, as illustrated in the accompanying drawings. Whenever possible, the same reference numerals will be used throughout the drawings to refer to the same or like parts.

FIG. 1 is a block diagram illustrating an image processing system 1 that includes a System-on-Chip (SoC) 4 and an associated memory 7. In one example embodiment, image processing system 1 may be incorporated in an imaging device, such as a printer. SoC 4 includes a processor unit 10, a memory interface unit 13, a rotate unit 16, and a system bus 19 for operatively interconnecting processor unit 10, memory interface unit 13, rotate unit 16 and other functional units incorporated in SoC 4. System bus 19, for example, may include an advanced microcontroller bus architecture (AMBA) advanced extensible interface (AXI) bus and may be connected to memory 7 via memory interface unit 13. Images obtained from various sources, such as a scanner, a camera, or other image capture devices, may be stored in memory 7. An image stored in memory may be divided into as few as one tile of image data and as many as any number of tiles that can be supported by memory 7. As used herein, a tile of image data refers to a rectangular piece of an image. For instance, FIG. 1 shows memory 7 storing an image 22 divided into a plurality of tiles T(1), T(2), . . . , T(N-1), T(N). Depending on the pixel bit depth of image data, the number of bits per pixel within a tile may vary. For example, the pixels within a tile may be 1, 2, 4, 8, 16 or 32 bits each.

Rotate unit 16 is generally used to perform image mirroring and/or rotation operations on an image, such as image 22 stored in memory 7. As shown, rotate unit 16 includes an input direct memory access (DMA) block 25, a rotate block 28, and an output DMA block 31. In one example embodiment, input DMA block 25 and output DMA block 31 may include custom logic designed to retrieve and write tiles of image data from/to memory 7, respectively. Image data from memory 7 may be retrieved by input DMA block 25 by burst transfer of any allowed burst size. Likewise, image data from output DMA block 31 may be transferred to memory 7 by burst transfer of any allowed burst size. Rotate block 28 is configured to receive a tile of image data from input DMA block 25 and provide a mirrored and/or rotated version of the tile of image data to output DMA block 31, as will be described in greater detail below.

Figure 2:
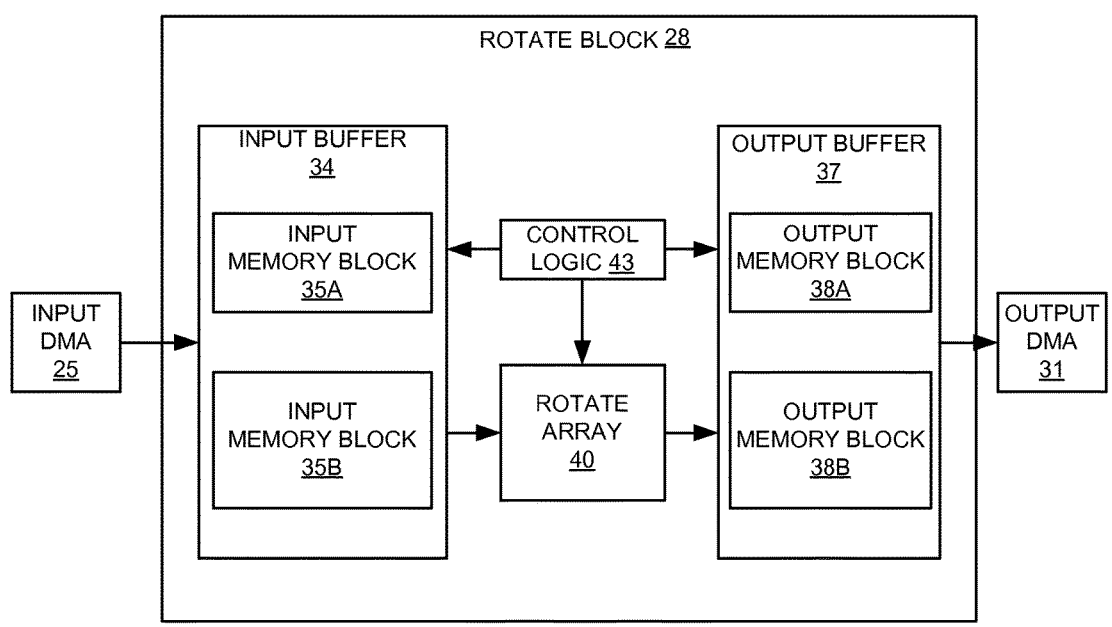
FIG. 2 illustrates a block diagram of a rotate block in the SoC of FIG. 1 according an example embodiment.

With reference to FIG. 2, an example block diagram of rotate block 28 is illustrated. Rotate block 28 includes an input buffer 34 and an output buffer 37 for storing image data, a rotate array 40 coupled therebetween, and control logic 43 for controlling various operations of input buffer 34, rotate array 40, and output buffer 37.

Input buffer 34 is communicatively coupled to input DMA block 25 to receive image data therefrom. In one example embodiment, input buffer 34 may be configured to hold two tiles of image data at a time in order to allow one tile to be loaded while another tile is being rotated. For example, a first tile of image data to be rotated may be stored in a first input memory block 35A and as the first tile is rotated, a second tile of image data may be loaded into a second input memory block 35B. In this way, another tile can be written to one input memory block while a tile in the other input memory block is being rotated. The manner in which input buffer 34 provides image data bits to rotate array 40 may depend on the mirroring and/or rotation operation to be performed on the image, as will be explained in greater detail below.

Rotate array 40 is configured to receive image data bits from input buffer 34 and store them in a matrix of rows and columns. Based on instructions received from control logic 43, rotate array 40 can shift in image data bits from input buffer 34 and shift out image data bits from rotate array 40 in a fashion that allows a desired rotated and/or mirrored image output to be achieved. The output of rotate array 40 is provided to output buffer 37. Generally, the image data bits that are outputted by rotate array 40 are used to form the mirrored and/or rotated version of the input image.

Output buffer 37 receives image data from rotate array 40 and is communicatively coupled to output DMA block 31 to send image data thereto. In one example embodiment, output buffer 37 may include two output memory blocks 38A, 38B such that as one set of image data is read out from one of the output memory blocks to output DMA block 31, another set of image data from the output of rotate array 40 may be written to the other output memory block. In this way, higher throughput may be achieved.

Figure 3:
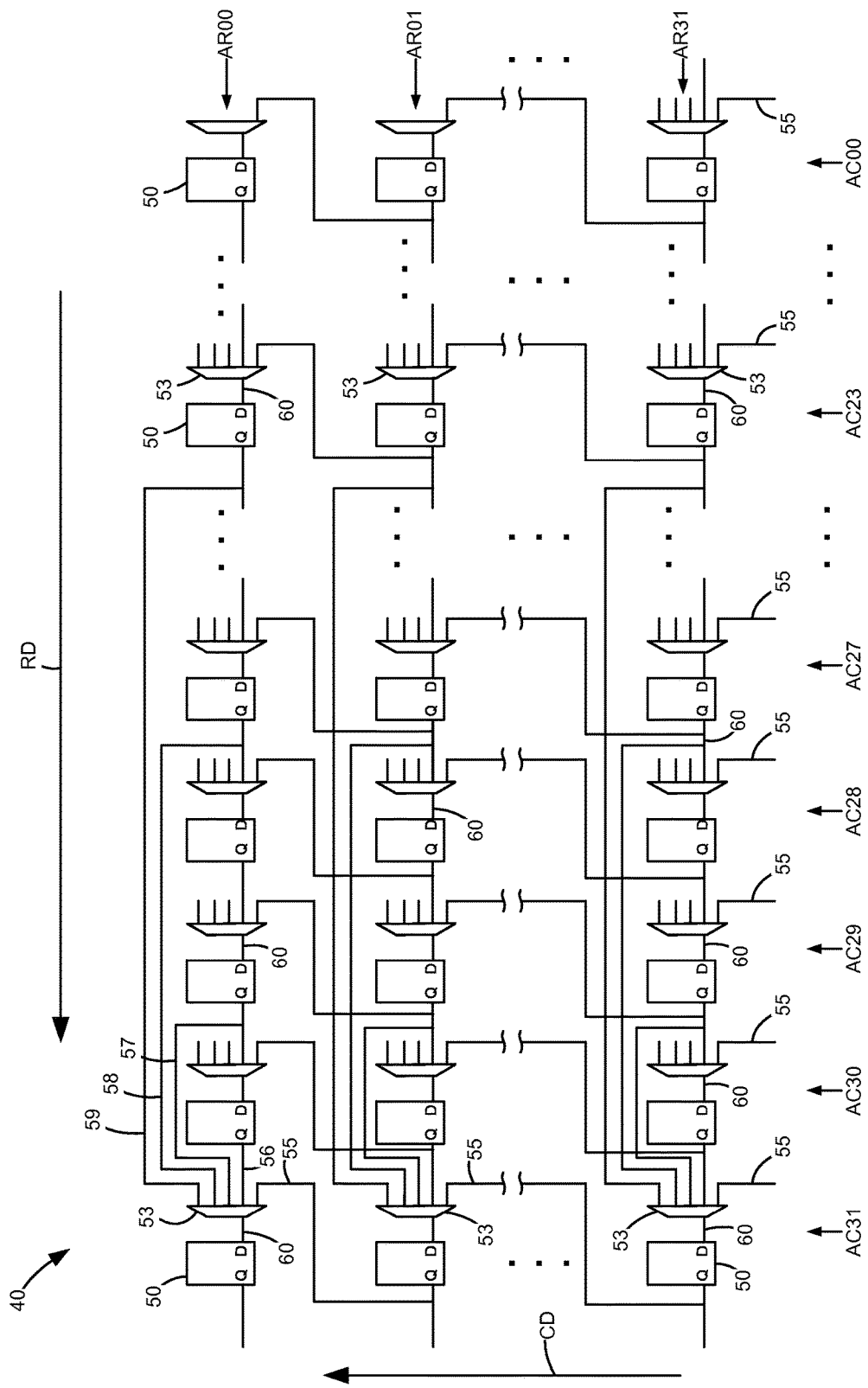
FIG. 3 illustrates a rotate array configuration in the rotate block of FIG. 2 according to an example embodiment.

In one example embodiment, rotate array 40 may be implemented using an array of bit storage units arranged in a plurality of rows and columns. With reference to FIG. 3, an example configuration of rotate array 40 is illustrated. As shown, rotate array 40 includes a matrix array of bit storage units 50, embodied as flip-flops 50, and multiplexers 53 for passing image data bits between flip-flops 50. Each flip-flop 50 captures and stores a bit of data appearing at its D-input at a triggering edge of a clock signal, and outputs the data bit at its Q-output shortly thereafter. Flip-flop circuits are well known in the art such that a further description of their operation will not be presented for reasons of simplicity.

In one example embodiment, flip-flops 50 and multiplexers 53 are arranged and connected to each other such that rotate array 40 can have data shifted into it in only one direction. Rotate array 40 shown in FIG. 3 includes a 32×32 matrix of array rows AR00-AR31 and array columns AC00-AC31. Each element in rotate array 40 is formed from a combination of a flip-flop 50 and a multiplexer 53 coupled together such that the output of multiplexer 53 is provided to the D-input of it corresponding flip-flop 50. In array column AC31, the bottom multiplexer 53 is coupled to input buffer 34 via a first input line 55 for receiving an image data bit from the input buffer 34, and has an output 60 coupled to the D-input of an adjacent flip-flop 50 in the array row AR31. The Q-output of flip-flop 50 in array row AR31 and array column AC31 is coupled to the first input line 55 of the multiplexer 53 above it in array column AC31 in the next array row AR30. The remaining flip-flops 50 and multiplexers 53 throughout rotate array 40 generally follow the same connection pattern such that image data bits provided at the first input lines 55 of each of the multiplexers 53 along array row AR31 can be passed from one flip-flop 50 to another in a column direction CD, i.e., from array row AR31 to array row AR00. In the example rotate array configuration, image data bits can be shifted up, as viewed from FIG. 3, within rotate array 40 until rotate array 40 is filled with image data bits.

In another example embodiment, flip-flops 50 and multiplexers 53 of rotate array 40 may be interconnected to each other in such a way that rotate array 40 can have data shifted out of it in only one direction. As an example, consider the flip-flop and multiplexer interconnections along array row AR00. Multiplexer 53 in column AC31 includes a second input 56 coupled to the Q-output of flip-flop 50 from array column AC30, a third input 57 coupled to the Q-output of flip-flop 50 from array column AC29 located two columns away from array column AC31, a fourth input 58 coupled to the Q-output of flip-flop 50 from array column AC27 located four columns away from array column AC31, and a fifth input 59 coupled to the Q-output of flip-flop 50 from array column AC23 located eight columns away from array column AC31. The interconnections for other multiplexers 53 have been omitted for simplicity, but it is noted that the remaining multiplexers 53 in rotate array 40 generally follow the same connection pattern. In this way, image data bits can be passed from one flip-flop 50 to another in a row direction RD, i.e., from array column AC00 to array column AC31. When shifting bits by one bit position along an array row AR, second input 56 of each multiplexer 53 is used to pass image data bits from a flip-flop 50 to the next flip-flop 50 to the left. When shifting bits within rotate array 40 by two, four, and eight bit positions in row direction RD, image data bits are passed on to destination flip-flops 50 via multiplexer inputs 57, 58, and 59, respectively, to bypass one or more flip-flops 50 between source and destination flip-flops. In this way, shifting of an image data bit by multiple bit positions can be achieved in one clock cycle. Alternatively, image data bits may be passed from one flip-flop 50 to a next flip-flop 50 multiple times via multiplexer inputs 56 until they reach a destination flip-flop 50, which involves using additional clock cycles. In the example configuration, image data bits from the leftmost one, two, four, or eight columns of rotate array 40 (or a total of 32, 64, 128, or 256 image data bits, respectively) can be left-shifted out of rotate array 40 at one time.

Thus, in the above rotate array configuration, the five multiplexer inputs 55, 56, 57, 58, and 59 allow each flip-flop 50 to receive a bit input from a flip-flop 50 in a row below it when shifting into rotate array 40 image data bits from input buffer 34, or a bit input from a flip-flop 50 that is one, two, four, or eight columns away to its right when shifting image data bits out of rotate array 40 and into output buffer 37. Further, by configuring rotate array 40 to be capable of shifting only in these two directions, the amount of multiplexing is reduced at the input of all flip-flops 50 that make up rotate array 40, which for a rotate array 40 having 32 rows and 32 columns as depicted in FIG. 3, is 1024 flip flops 50.

Operation of performing image mirroring and/or rotation on an image using image processing system 1 will now be described in further detail. In order to perform a mirroring and/or a rotation operation on an image, input DMA block 25 may retrieve one or more tiles of the image from memory 7 and provide them to rotate block 28. It will be appreciated, though, that any memory buffer containing an input image may be used as a source from which tiles are retrieved. Typically, the length of data that input DMA block 25 can retrieve from memory 7 may be a word, and input DMA block 25 may round up to a nearest word boundary when retrieving image data. In one example, data words that do not land on a word boundary may be added with "don't care" data that can be later removed after rotation, such as by using mask registers (not shown). In the examples discussed hereinafter, one data word is 32 bits. However, it will be appreciated that other word lengths may be used.

Input DMA block 25 may provide one tile of image data at a time to rotate block 28 for processing thereby in an order that is based on the mirroring and/or rotation operation to be performed on the image. In one example embodiment, the order in which input DMA block 25 provides tiles to rotate block 28 may be selected in correspondence with how output DMA block 31 writes tiles to memory 7 such that output DMA block 31 can write tiles of the resulting rotated image into memory 7 in the correct order. FIGS. 4A-4F illustrate different concepts of rotating an original image 70, with or without mirroring, and corresponding sequences or orders in which tiles T of the original image 70 are provided to rotate block 28 to achieve a desired mirrored and/or rotated image 75. It is further noted that in the following examples, output DMA block 31 is programmed to output tiles in a top-left justified order, i.e., to write tiles to memory 7 from left-to-right and top-to-bottom. In one example embodiment, the order in which input DMA block 25 provides tiles to rotate block 28 may correspond to the order in which input DMA block 25 retrieved the tiles from memory 7. Based at least on input image parameters, input DMA block 25 may be configured to automatically calculate the sizes of the remaining tiles and retrieve the tiles from memory 7 without firmware intervention.

Figure 4A:
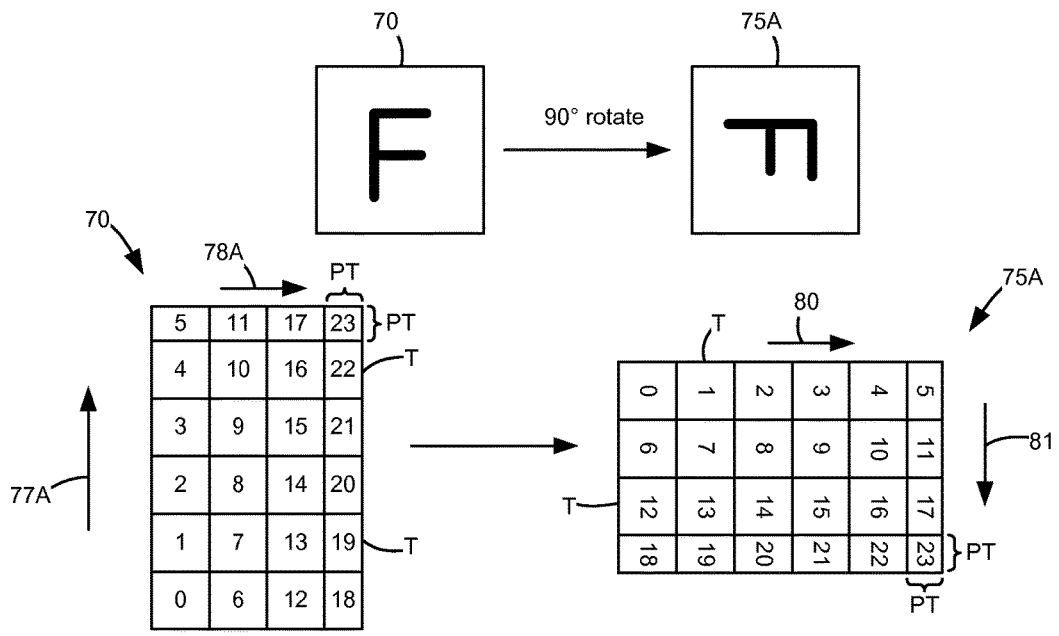
FIG. 4A illustrates a 90° rotate operation without mirroring performed on an image according to an example embodiment.

In FIG. 4A, the original image 70 is orthogonally rotated by an angle of 90° without mirroring to produce rotated image 75A. To achieve the rotated image 75A, input DMA block 25 provides tiles T of the original image 70 to rotate block 28 starting from the bottom-left corner to the top-left corner thereof, as indicated by the tile direction 77A, before moving to the next column of tiles to the right, as indicated by the swath direction 78A. The process is repeated until all the tiles have been provided to and processed by rotate block 28. For reference, tiles T have been numbered 0 to 23 according to the order in which they are provided to rotate block 28. A descriptor source address may provide the starting address corresponding to the bottom-left corner of the original image 70. As shown, providing the tiles T from the bottom to the top of the original image 70 allows output DMA block 31, after the tiles T are rotated by rotate block 28, to produce the rotated image 75A by writing tiles T from left-to-right, as indicated by direction 80, and top-to-bottom, as indicated by direction 81. Additionally, by configuring input DMA block 25 to provide tiles in the illustrated order, partial tiles PT (i.e., tiles that are relatively smaller than the normal tile size due to the input image not being aligned to a word boundary in height and/or width) at the edges of the original image 70 end up on the right and bottom sides of the rotated image 75A which can make subsequent operations on the rotated image 75A easier since no left-side clipping of data may be required.

Figure 4B:
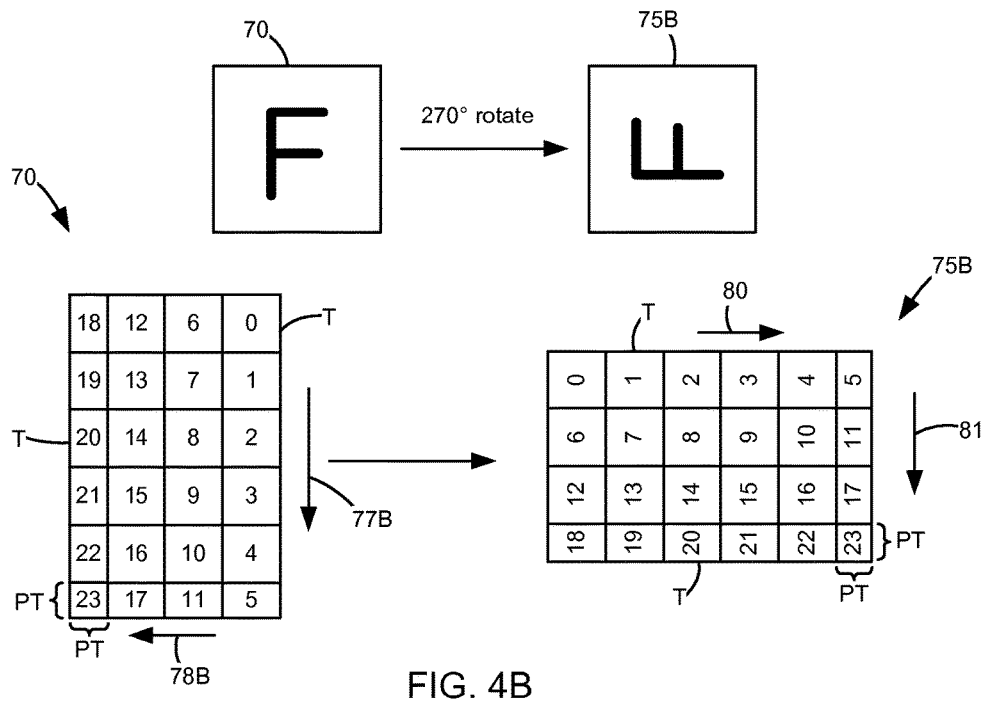
FIG. 4B illustrates a 270° rotate operation without mirroring performed on an image according to an example embodiment.

In FIG. 4B, the original image 70 is orthogonally rotated by an angle of 270° without mirroring to produce rotated image 75B. In this example, input DMA block 25 provides tiles T to rotate block 28 starting from the top-right corner to the bottom-right corner of the original image 70, as indicated by tile direction 77B, before moving to the next column of tiles to the left, as indicated by swath direction 78B. For reference, tiles T have been numbered 0 to 23 according to the order in which they are provided to rotate block 28. A descriptor source address may provide the starting address corresponding to the top-right corner of the original image 70. As shown, providing the tiles T from the top to the bottom of the original image 70 allows output DMA block 31, after the tiles are rotated by rotate block 28, to produce the rotated image 75B by writing tiles from left-to-right as indicated by direction 80, and top-to-bottom as indicated by direction 81. Additionally, partial tiles PT at the edges of the original image 70 end up on the right and bottom sides of the rotated image 75B.

Figure 4C:
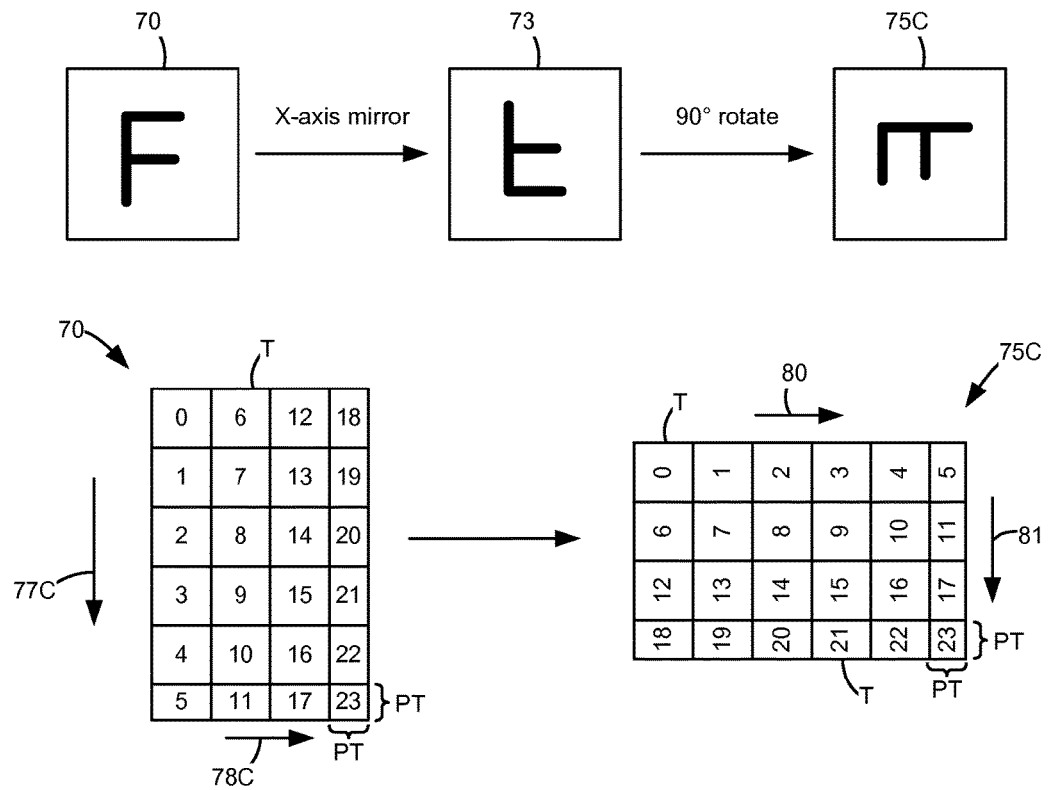
FIG. 4C illustrates a combined 90° rotate operation and vertical mirroring performed on an image according to an example embodiment.

In FIG. 4C, a combined vertical mirroring and 90° rotation function is performed on the original image 70. In concept, the original image 70 is first mirrored about the x-axis to produce a vertically mirrored image 73, and thereafter orthogonally rotated by an angle of 90° to produce the mirrored and rotated image 75C. To achieve rotated image 75C, input DMA block 25 provides tiles T to rotate block 28 starting from the top-left corner to the bottom-left corner of the original image 70, as indicated by tile direction 77C before moving to the next column of tiles to the right, as indicated by swath direction 78C. For reference, tiles T have been numbered 0 to 23 according to the order in which they are provided to rotate block 28. A descriptor source address may provide the starting address corresponding to the top-left corner of the original image 70. As shown, providing the tiles T from the top to the bottom of the original image 70 allows output DMA block 31, after the tiles are mirrored and rotated by rotate block 28, to produce the rotated image 75C by writing tiles from left-to-right as indicated by direction 80, and top-to-bottom as indicated by direction 81. Partial tiles PT at the edges of the original image 70 also end up on the right and bottom sides of the rotated image 75C.

Figure 4D:
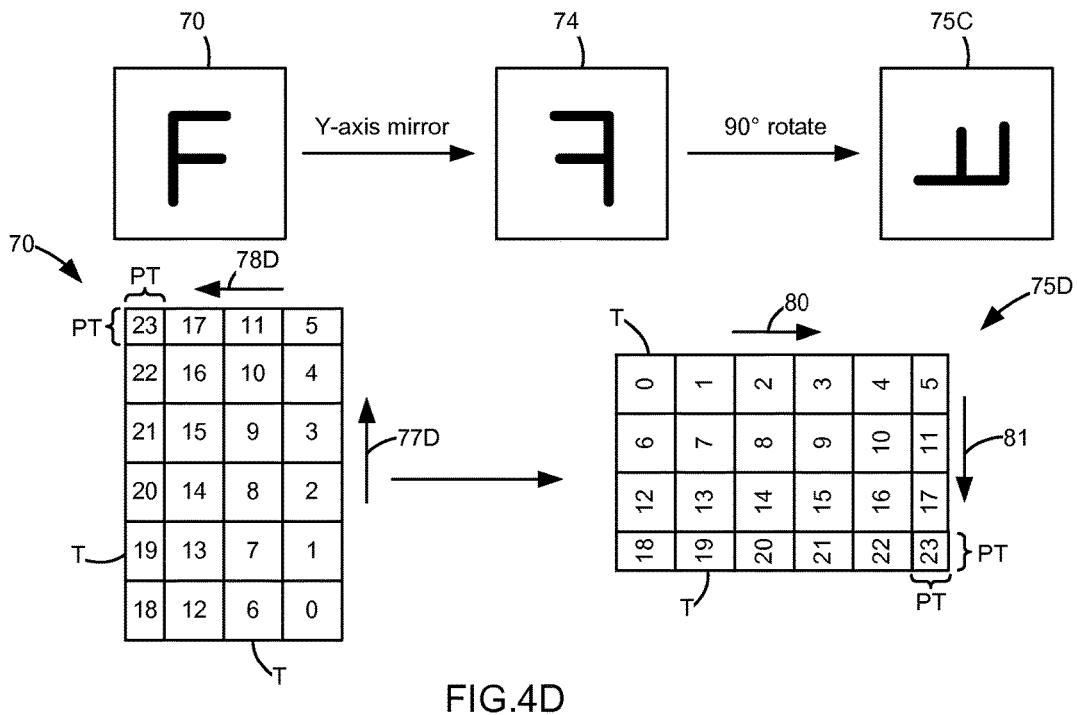
FIG. 4D illustrates a combined 90° rotate operation and horizontal mirroring performed on an image according to an example embodiment.

In FIG. 4D, a combined horizontal mirroring and 90° rotation function is performed on the original image 70. In concept, the original image 70 is first mirrored about the y-axis to produce a horizontally mirrored image 74, and thereafter orthogonally rotated by an angle of 90° to produce the mirrored and rotated image 75D. To achieve rotated image 75D, input DMA block 25 provides tiles to rotate block 28 starting from bottom-right corner to the top-right corner of the original image 70, as indicated by tile direction 77D, before moving to the next column of tiles to the left, as indicated by swath direction 78D. For reference, tiles T have been numbered 0 to 23 according to the order in which they are provided to rotate block 28. A descriptor source address may provide the starting address corresponding to the bottom-right corner of the original image 70. As shown, providing the tiles from the bottom to the top of the original image 70 allows output DMA block 31, after the tiles are mirrored and rotated by rotate block 28, to produce the rotated image 75D by writing tiles from left-to-right as indicated by direction 80, and top-to-bottom as indicated by direction 81. Partial tiles PT at the edges of the original image 70 also end up on the right and bottom sides of the rotated image 75D.

Figure 4E:
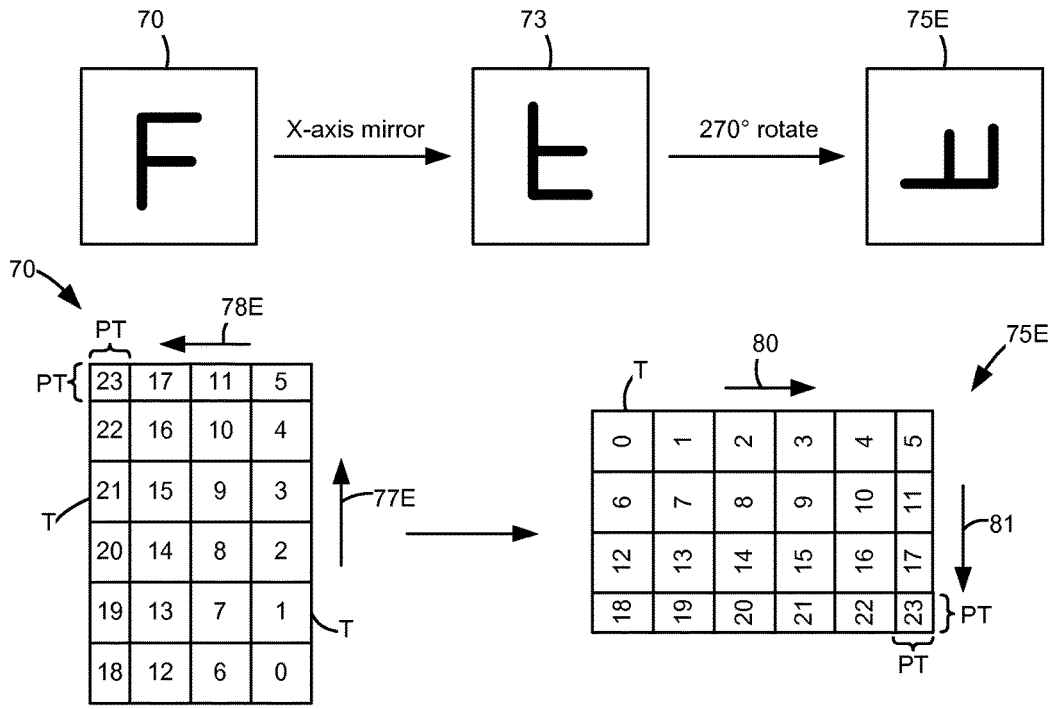
FIG. 4E illustrates a combined 270° rotate operation and vertical mirroring performed on an image according to an example embodiment.

In FIG. 4E, a combined vertical mirroring and 270° rotation function is performed on the original image 70. In concept, the original image 70 is first mirrored about the x-axis to produce a vertically mirrored image 73, and thereafter orthogonally rotated by an angle of 270°. As can be observed, the resulting rotated image 75E has a similar orientation to that of rotated image 75D illustrated in FIG. 4D. Thus, input DMA block 25 may provide tiles T to rotate block 28 in the same order illustrated in FIG. 4D to produce rotated image 75E.

Figure 4F:
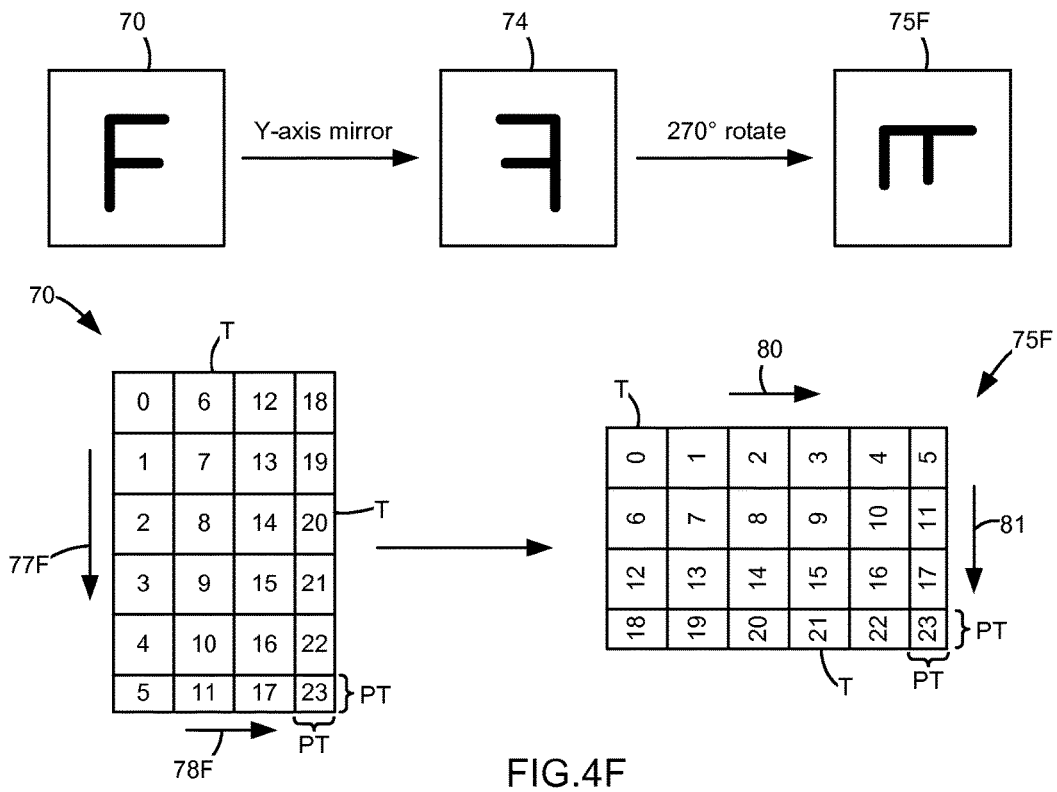
FIG. 4F illustrates a combined 270° rotate operation and horizontal mirroring performed on an image according to an example embodiment.

In FIG. 4F, a combined horizontal mirroring and 270° rotation function is performed on the original image 70. In concept, the original image 70 is first mirrored about the y-axis to produce a horizontally mirrored image 74, and thereafter orthogonally rotated by an angle of 270°. As can be observed, the resulting rotated image 75F has a similar orientation to that of rotated image 75C illustrated in FIG. 4C. Thus, input DMA block 25 may provide tiles T to rotate block 28 in the same order illustrated in FIG. 4C to produce rotated image 75F.

As will be appreciated, output DMA block 31 may be programmed to step tiles using different directions other than those depicted in the above examples, so long as input DMA block 25 is programmed to retrieve and provide tiles in an order that would allow output DMA block 31 to write rotated tiles into memory 7 in the correct order that forms the desired mirrored and/or rotated image.

Figure 5:
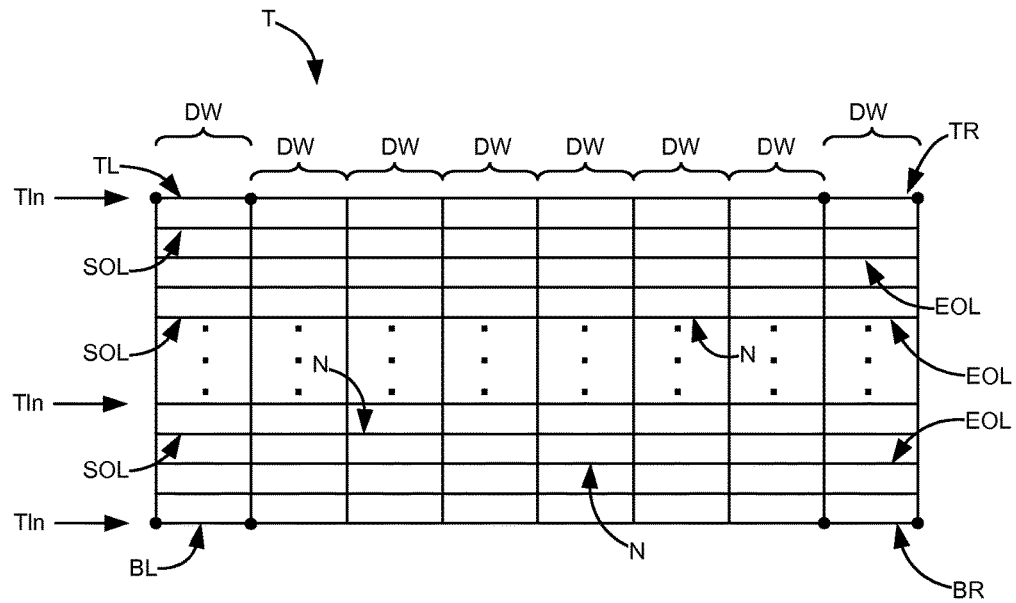
FIG. 5 illustrates a tile of image data including a plurality of tile lines according to an example embodiment.

In one example embodiment, input DMA block 25 may assign or generate an attribute or a data type for each tile word sent to rotate block 28. The data types are generally used to describe the location of a word in the tile being received by rotate block 28. With reference to FIG. 5, there is shown a diagram illustrating an example tile T including a plurality of tile lines Tln with each tile line Tln including eight data words DW. Various data types associated with different data words DW of tile T are illustrated which include Top Left (TL), Top Right (TR), Bottom Left (BL), Bottom Right (BR), Start of Line (SOL), and End of Line (EOL). Data type SOL indicates that a data word is a first word of a tile line, data type EOL indicates that a data word is the last word of a tile line, data type TL indicates that a data word is located at the top left of the tile T and is the first word of the first tile line, data type TR indicates that a data word is located at the top right of the tile T and is the last word of the first tile line, data type BL indicates that a data word is located at the bottom left of the tile T and is the first word of the last tile line, and data type BR indicates that a data word is located at the bottom right of the tile T and/or is the last word of the last tile line. Other data words residing between the first and last data words DW of a tile line Tln may be associated with a data type N (Normal). Because each word coming from input DMA block 25 has a data-type associated with it, rotate block 28 may be able to determine where in the tile each data word DW resides. This determination may be performed by control logic 43 or within input buffer 34, for example. Further, rotate block 28 may use the data types to dynamically calculate an incoming tile width and height which are then used to calculate input buffer addresses when retrieving data words from input buffer 34. In this way, rotate block 28 may operate on variable sized tiles without firmware intervention.

Figure 6:
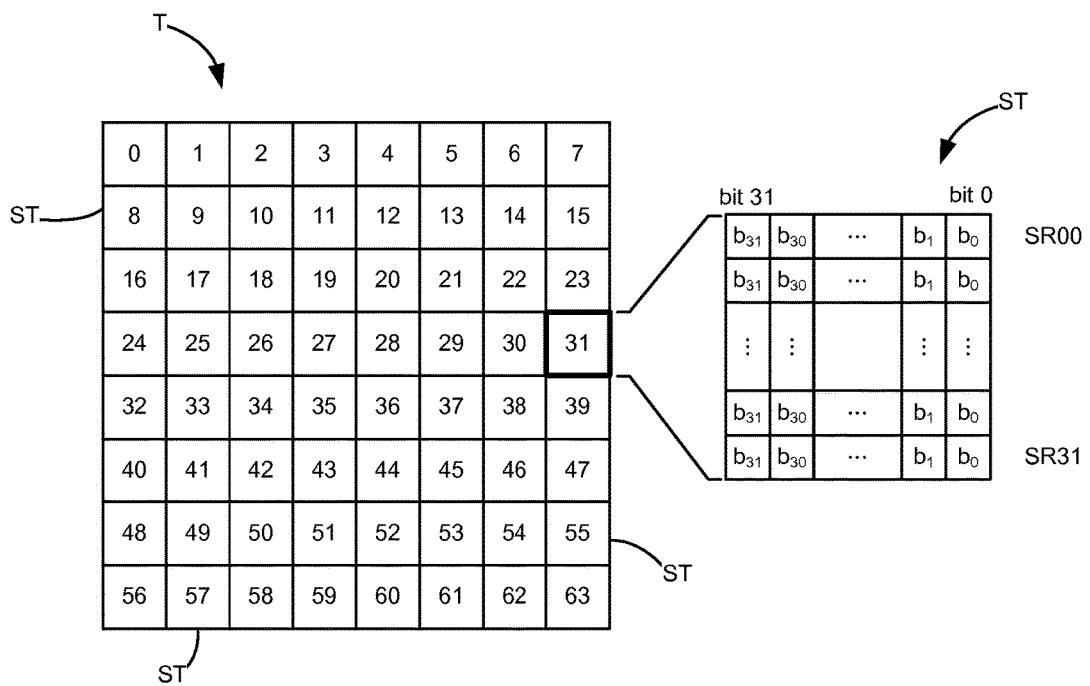
FIG. 6 illustrates a tile subdivided into a plurality of subtiles according to an example embodiment.

Operation of rotate block 28 will now be described in further detail. Rotate block 28 operates when a full tile of image data from input DMA block 25 is loaded into input buffer 34. Once a full tile is loaded into input buffer 34, the tile is subdivided into a plurality of subtiles. As an example, FIG. 6 shows a tile T subdivided into sixty-four subtiles ST. The subtiles ST have been numbered from 0 to 63 so they can be easily referenced in later examples. Each subtile ST can be any size and have any number of rows and columns, but for purposes of illustration, is shown herein as being 32 bits wide (32 subtile columns) and 32 bits tall (32 subtile rows). Consequently, tile T is 256 bits wide by 256 lines tall.

According to one example embodiment, the subtiles ST are processed in a predefined order to achieve desired mirroring and/or rotation results. For each of the rotation operations with or without mirroring illustrated in FIGS. 4A-4F, a corresponding subtile processing order 85 in which subtiles are processed to achieve the desired mirrored and/or rotated image 75 is illustrated in FIGS. 7A-7F, respectively.

For the 90° rotation without mirroring operation illustrated in FIG. 4A, subtiles ST of tile T are processed from the bottom left subtile ST56 (FIG. 6) to the top left subtile ST0 before moving to the next column of subtiles to the right where subtiles are also processed from the bottom subtile to the top subtile. The process is repeated until all subtiles ST have been processed. In this example, the order in which the subtiles ST are processed is illustrated by subtile processing order 85A in FIG. 7A. The subtile processing order 85A depicts the arrangement of subtiles, after processing, being virtually rotated by an angle of 90° relative to the arrangement shown in FIG. 6. Additionally, as can be observed, the subtile processing order 85A corresponds to the order in which tiles are provided by input DMA block 25 to rotate block 28.

For the 270° rotation without mirroring operation illustrated in FIG. 7B, subtiles ST of tile are T processed from the top right subtile ST7 (FIG. 6) to the bottom right subtile ST63 before moving to the next column of subtiles to the left where subtiles are also processed from the top subtile to the bottom subtile. The process is repeated until all subtiles ST have been processed. In this example, the order in which the subtiles ST are processed is illustrated by subtile processing order 85B in FIG. 7B. The subtile processing order 85B depicts the arrangement of subtiles, after processing, being virtually rotated by an angle of 270° relative to the arrangement shown in FIG. 6, and corresponding to the order in which tiles are provided by input DMA block 25 to rotate block 28.

For the combined vertical mirroring and 90° rotation function illustrated in FIG. 4C, subtiles ST of tile T are processed from the top left subtile ST0 (FIG. 6) to the bottom left subtile ST56 before moving to the next column of subtiles to the right where subtiles are also processed from the top subtile to the bottom subtile. The process is repeated until all subtiles ST have been processed. In this example, the order in which the subtiles ST are processed is illustrated by subtile processing order 85C in FIG. 7C. The subtile processing order 85C depicts the arrangement of subtiles, after processing, being virtually mirrored about the x-axis and rotated by an angle of 90° relative to the arrangement shown in FIG. 6, and corresponding to the order in which tiles are provided by input DMA block 25 to rotate block 28.

For the combined horizontal mirroring and 90° rotation function illustrated in FIG. 4D, subtiles ST of tile T are processed from bottom right subtile ST63 (FIG. 6) to the top right subtile ST7 before moving to the next column of subtiles to the left where subtiles are also processed from the bottom subtile to the top subtile. The process is repeated until all subtiles ST have been processed. In this example, the order in which the subtiles ST are processed is illustrated by subtile processing order 85D in FIG. 7D. The subtile processing order 85D depicts the arrangement of subtiles, after processing, being virtually mirrored about the y-axis and rotated by an angle of 90° relative to the arrangement shown in FIG. 6, and corresponding to the order in which tiles are provided by input DMA block 25 to rotate block 28.

For the combined vertical mirroring and 270° rotation function illustrated in FIG. 4E, a subtile processing order 85E shown in FIG. 7E is followed, which corresponds to the subtile processing order 85D illustrated in FIG. 7D. The resulting arrangement of subtiles, after processing, is virtually rotated about the x-axis and rotated by an angle of 270° relative to the subtile arrangement shown in FIG. 6.

For the combined horizontal mirroring and 270° rotation function illustrated in FIG. 4F, a subtile processing order 85F shown in FIG. 7F is followed, which is similar to subtile processing order 85C illustrated in FIG. 7C. The resulting arrangement of subtiles, after processing, is virtually rotated about the y-axis and rotated by an angle of 270° relative to the subtile arrangement shown in FIG. 6.

Based on the mirroring and/or rotation operation to be performed on the original image 70, the appropriate subtile processing order 85 is determined. The subtiles ST are then processed one at a time in the order defined by the determined subtile processing order 85. When processing each subtile ST, image data bits thereof are shifted into rotate array 40. In one example embodiment, shifting of image data bits of a subtile ST into rotate array 40 is according to a subtile row read (and/or load) direction that is defined based upon the mirror and/or rotate operation to be performed, as will be explained in further detail below. After shifting all the image data bits of a subtile ST into rotate array 40, the image data bits in rotate array 40 are repeatedly shifted by a shift amount to shift out image data bits until all image data bits are shifted out of rotate array 40 and provided to output buffer 37. In one example embodiment, the shift amount may correspond to the bit depth or number of bits-per-pixel of image data. The image data bits that are shifted out of rotate array 40 from each shifting operation by the shift amount forms one subtile row of the rotated subtile. In general, rotate array 40 outputs image data bits and output buffer 37 stores the outputted image data bits in a manner that forms the rotated subtile. In one example embodiment, once a whole row of subtiles has been rotated and buffered in one of the output memory blocks 38A, 38B of output buffer 37, the rotated subtiles may be transferred to output DMA block 31 while rotated subtiles from the next row of subtiles are buffered in the other of the output memory blocks 38A, 38B.

FIGS. 8A-8D show illustrative examples of shifting image data bits from an original subtile OST into and out of rotate array 40 to produce a rotated subtile RST for each of the mirror and/or rotate operations described in FIGS. 4A-4D, respectively, according to a 1 bpp case. For purposes of illustration, the original subtile OST includes 32 subtile rows SR00-SR31 each having 32 bits of image data, and rotate array 40 includes 32 array rows AR00-AR31 each for storing 32 bits of image data. A sample set of image data bits in the original subtile OST, which may have either a binary "0" or "1" bit value, have been denoted by $r_m b_n$ (where $r_m$ indicates a row location of an image data bit in the original subtile OST with m=0 to 31, and $b_n$ indicates a bit location of an image data bit in the original subtile OST with n=0 to 31) so they can be easily referenced as they are shifted into and out of rotate array 40. For instance, image data bit $r_0 b_1$ is located in original subtile row SR00 at the bit 1 location, and image data bit $r_{31} b_{30}$ is located in original subtile row SR31 at the bit 30 location. Additionally, in the following examples, the functionalities of the rotate array configuration illustrated in FIG. 3 is used to demonstrate the shifting of image data bits into and out of rotate array 40.

Figure 8A:
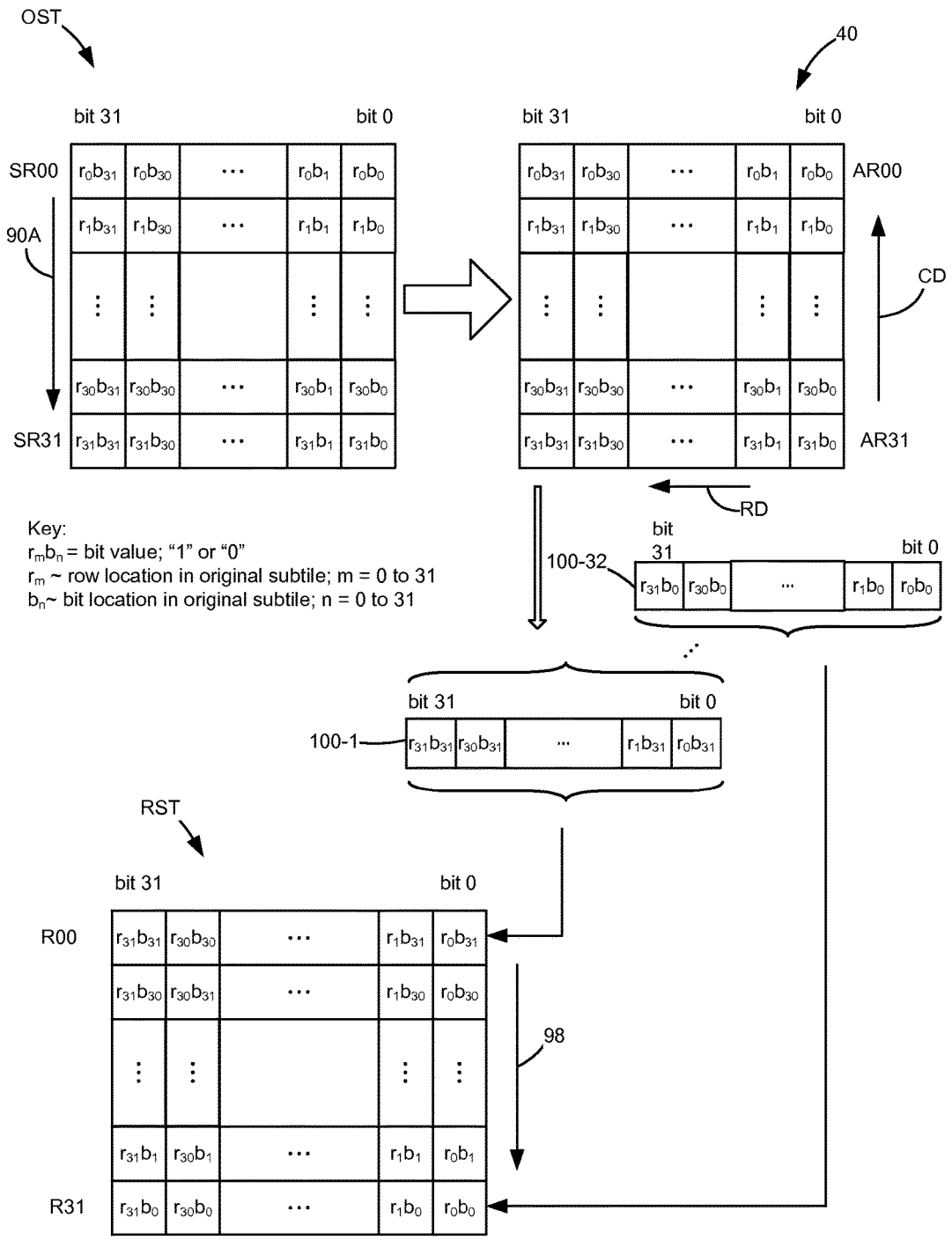
FIG. 8A is a diagram illustrating shifting of image data bits into and out of the rotate array when a 90° rotate operation without mirroring is performed in a 1 bit-per-pixel case, according to an example embodiment.

FIG. 8A illustrates an example embodiment in which image data bits from the original subtile OST are shifted into and out of rotate array 40 when a 90° rotate operation without mirroring is performed for a 1 bpp case. In this example embodiment, subtile rows SR of the original subtile OST are read out of input buffer 34 and loaded into rotate array 40 starting from the top subtile row SR00 to the bottom subtile row SR31, as indicated by the subtile row read direction 90A. Accordingly, image data bits of the top subtile row SR00 are shifted first into rotate array 40 and image data bits of bottom subtile row SR31 are shifted last into rotate array 40. Control logic 43 may determine a starting address in input buffer 34 corresponding to the top subtile row SR00, such as based upon the data types associated with each tile word. Control logic 43 may read the top subtile row SR00 from input buffer 34 and shift that subtile row into rotate array 40, and then a positive offset is added to the input buffer address to retrieve the next subtile row SR01. The process is repeated until all the image data bits of original subtile OST has been shifted into rotate array 40.

Using the rotate array configuration illustrated in FIG. 3, thirty-two image data bits of a subtile row SR are parallel-shifted into rotate array 40 via first input lines 55 of multiplexers 53 along array row AR31. When a new subtile row is shifted into rotate array 40 via input lines 55, image data bits in rotate array 40 are shifted in the column direction CD. Thus, image data bits in rotate array 40 are passed from an array row to a next array row in the column direction CD as new subtile rows are shifted into rotate array 40 such that after all image data bits of original subtile OST are shifted into rotate array 40, image data bits from the top subtile row SR00 of original subtile OST are located along top array row AR00, image data bits from original subtile row SR01 are located along array row AR01, etc., and image data bits from the bottom subtile row SR31 are located along bottom array row AR31.

Once rotate array 40 is full, the image data bits therein are repeatedly shifted by a shift amount, which depends upon the pixel bit depth, in the row direction RD to shift multiple image data bits at a time out of rotate array 40 until all the image data bits therein are shifted out. For example, in the 1 bpp case, each image data bit in rotate array 40 is shifted by one bit position along row direction RD which, in effect, results in image data bits in rotate array 40 being passed from an array column to a next array column in the row direction RD during a shifting operation. Thirty-two image data bits along the leftmost array column (i.e., bits occupying the bit 31 positions) are parallel-shifted out of rotate array 40 at one time for each shifting operation, and the shifting operation is repeatedly performed 32 times in order to shift all image data bits out of rotate array 40. In this example embodiment, each group of thirty-two image data bits shifted out in parallel are combined to form one output word 100 with the image data bit $r_0 b_n$ shifted out from the top array row AR00 occupying the bit 0 position and the image data bit $r_{31} b_n$ shifted out from the bottom array row AR31 occupying the bit 31 position of the output word 100. Each output word 100 from rotate array 40 is used to form one subtile row of rotated subtile RST. Thus, the first output word 100-1 including image data bits that are first shifted out of rotate array 40 (i.e., image data bits originally occupying the leftmost array column) form the top row R00 of rotated subtile RST. Subsequent output words 100 are used to form subsequent rows of the rotated subtile, as indicated by direction 98. As shown, the last output word 100-32 including image data bits that are last shifted out of rotate array 40 (i.e., image data bits originally occupying the rightmost array column) form the bottom row R31 of rotated subtile RST. It can also be observed that the image data bits in rotated subtile RST, relative to the image data bits in rotate array 40, are rotated by an angle of 90°. Thus, rotate array 40 effectively performs a 90° rotate operation on the image data bits therein as they are shifted out.

Figure 8B:
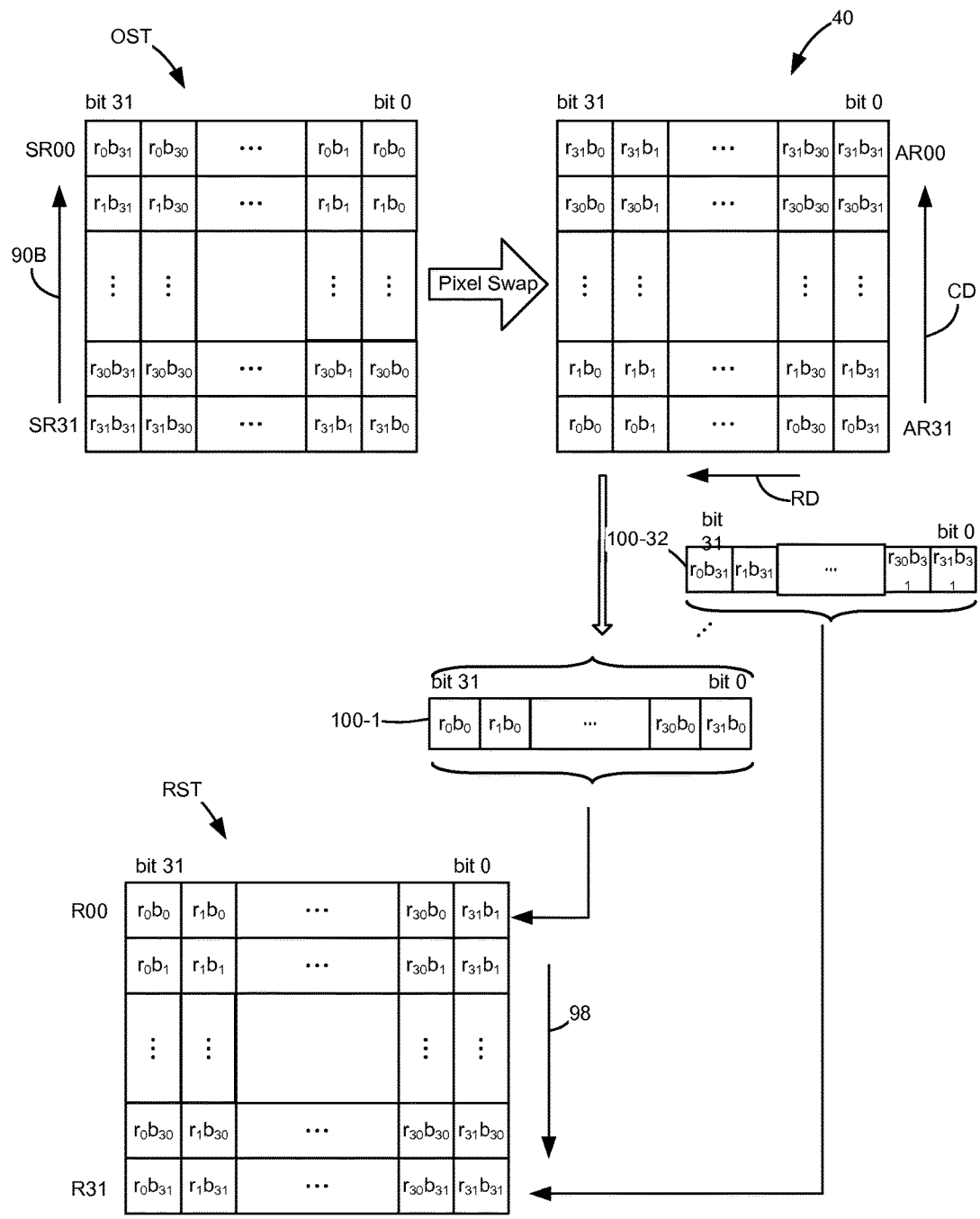
FIG. 8B is a diagram illustrating shifting of image data bits into and out of the rotate array when a 270° rotate operation without mirroring is performed in a 1 bpp case, according to an example embodiment.

FIG. 8B illustrates an example embodiment in which image data bits from the original subtile OST are shifted into and out of rotate array 40 when a 270° rotate operation without mirroring is performed for a 1 bpp case. In this example embodiment, subtile rows SR of the original subtile OST are read out of input buffer 34 and loaded into rotate array 40 starting from the bottom subtile row SR31 to the top subtile row SR00, as indicated by the subtile row read direction 90B. Accordingly, image data bits from the bottom subtile row SR31 are shifted first into rotate array 40 and image data bits from the top subtile row SR00 are shifted last into rotate array 40. Control logic 43 may determine a starting address in input buffer 34 corresponding to the bottom subtile row SR31 of the original subtile OST, read the bottom subtile row SR31 from input buffer 34 and shift that subtile row into rotate array 40, and then add a negative offset to the input buffer address to retrieve the next subtile row SR30. The process is repeated until all the image data bits of original subtile OST have been shifted into rotate array 40.

Figure 9A:
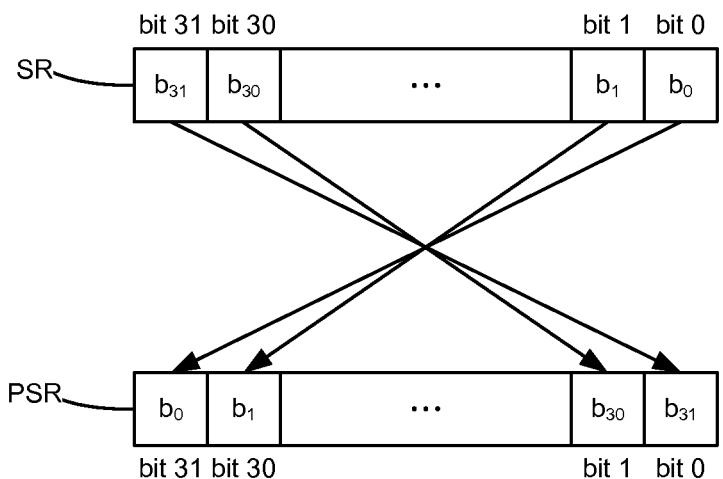
FIGS. 9A and 9B illustrate pixel swapping operations for a 1 bpp case and a 2 bpp case, respectively, according to an example embodiment.
Figure 9B:
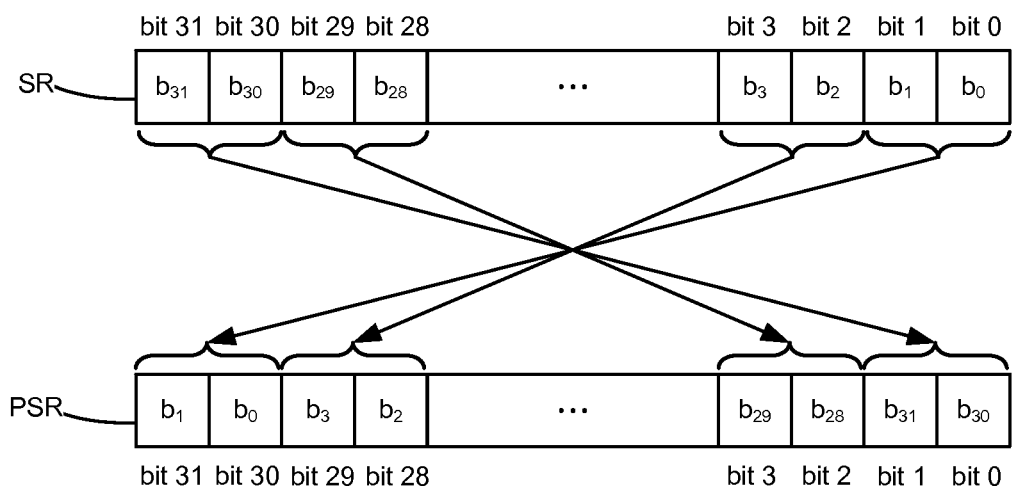

In this example embodiment, rotate block 28 performs a pixel swapping operation on image data bits of a subtile row before they are shifted into rotate array 40. Pixel swapping generally includes reversing the pixel locations of pixels in a subtile row, i.e., taking a first pixel in a subtile row SR and making it the last pixel, taking the last pixel and making it the first pixel, and so on, which results in horizontal mirroring of pixels in the subtile row SR. The pixel swap configuration is determined based on the pixel bit depth. With reference to FIGS. 9A and 9B, pixel swapping operations are illustrated on a sample set of thirty-two image data bits $b_0, b_1, \ldots, b_{31}$ of a subtile row SR for different pixel bit depths. FIG. 9A illustrates pixel swapping in a 1 bit-per-pixel case where the bit value $b_0$ (originally in the bit 0 position) is swapped with the bit value $b_{31}$ (originally in bit 31 position), bit value $b_1$ (originally in the bit 1 position) is swapped with the bit value $b_{30}$ (originally in the bit 30 position), and so on, such that the pixel-swapped subtile row PSR includes image data bits that are reversed in order relative to the bit pattern in the subtile row SR. Meanwhile, FIG. 9B illustrates pixel swapping in a 2 bit-per-pixel case where bit values $b_1, b_0$ (originally in the bit 1 and bit 0 positions, respectively) are swapped with bit values $b_{31}, b_{30}$ (originally in the bit 31 and bit 30 positions, respectively), bit values $b_3, b_2$ (originally in the bit 3 and bit 2 positions, respectively) are swapped with bit values $b_{29}, b_{28}$ (originally in the bit 29 and bit 28 positions, respectively), and so on. Accordingly, the rightmost pixel in the subtile row SR including bit values $b_1, b_0$ becomes the leftmost pixel in the pixel-swapped subtile row PSR, and the leftmost pixel in the subtile row SR including bit values $b_{31}, b_{30}$ becomes the rightmost pixel in the pixel-swapped subtile row PSR. Pixel swapping operation for other bit depths are performed in a similar fashion wherein a group of image data bits forming one pixel is swapped with another group of image data bits forming another pixel to achieve horizontal mirroring of pixels in a subtile row SR.

Referring back to FIG. 8B, pixel-swapped image data bits of each subtile row SR are parallel-shifted into rotate array 40 in a similar manner described above with respect to FIG. 8A. Accordingly, after all image data bits of original subtile OST are shifted into rotate array 40, image data bits from the bottom subtile row SR31 (which are first shifted into rotate array 40) end up along top array row AR00 with a reversed bit pattern, and image data bits from the top original subtile row SR00 (which are last shifted into rotate array 40) end up along the bottom array row AR00 with a reversed bit pattern. Once rotate array 40 is full, the same operations involving the shifting of image data bits out of rotate array 40 described above with respect to FIG. 8A are performed such that the first output word 100-1 forming image data bits that originally occupied the leftmost array column and are first shifted out of rotate array 40 form the top row R00 of rotated subtile RST, and the last output word 100-32 forming image data bits that originally occupied the rightmost array column and are last shifted out of rotate array 40 form the bottom row R31 of rotated subtile RST.

Figure 8C:
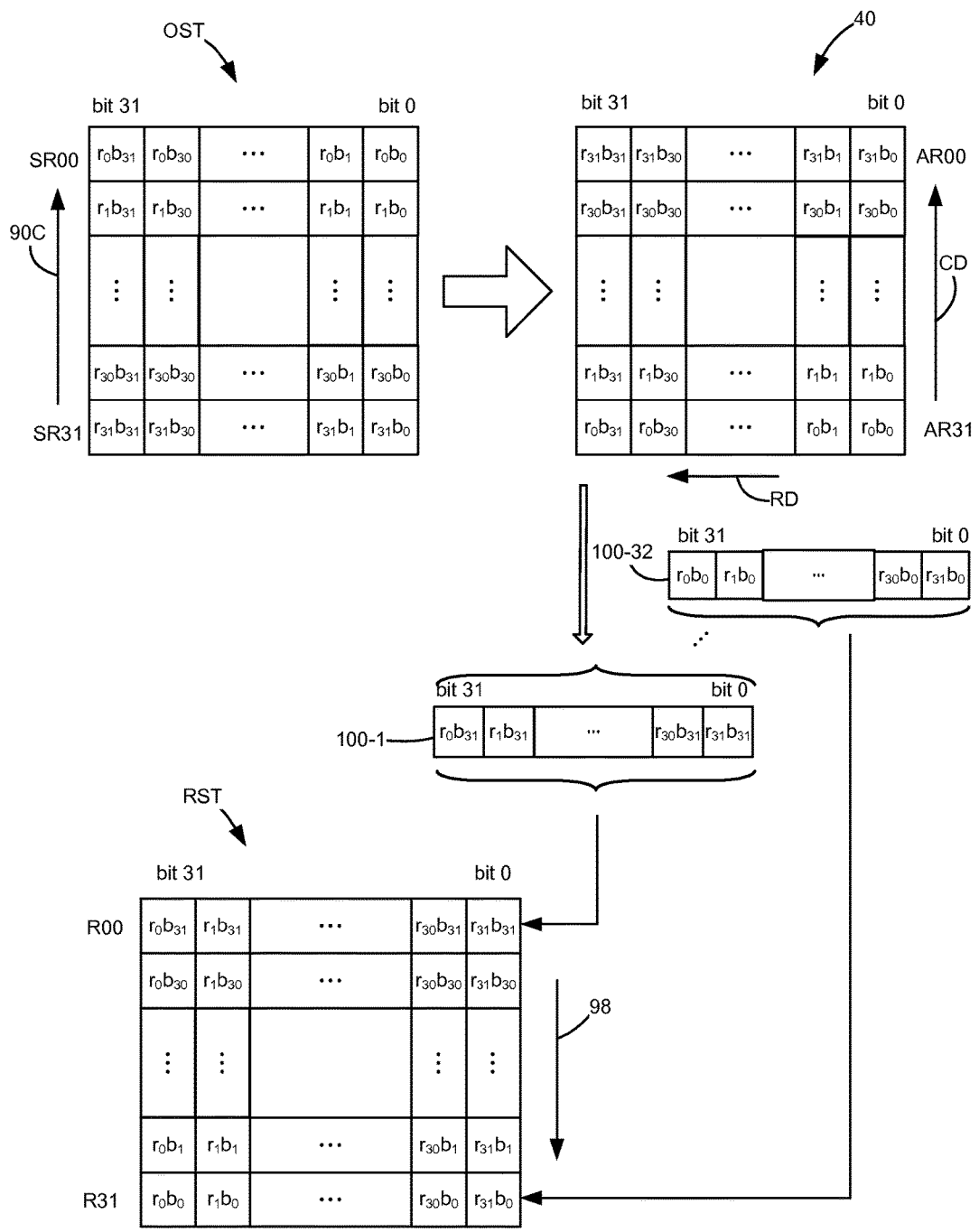
FIG. 8C is a diagram illustrating shifting of image data bits into and out of the rotate array when a 90° rotate operation with vertical mirroring is performed in a 1 bpp case, according to an example embodiment.

FIG. 8C illustrates an example embodiment in which image data bits from the original subtile OST are shifted into and out of rotate array 40 when a 90° rotate operation with vertical mirroring is performed for a 1 bpp case. In this example embodiment, subtile rows SR of the original subtile OST are read out of input buffer 34 and loaded into rotate array 40 starting from the bottom subtile row SR31 to the top subtile row SR00, as indicated by the subtile row read direction 90C. Accordingly, image data bits of the bottom subtile row SR31 are shifted first into rotate array 40 and image data bits of top subtile row SR00 are shifted last into rotate array 40. Control logic 43 may determine a starting address in input buffer 34 corresponding to the bottom subtile row SR31 of the original subtile OST, read the bottom subtile row SR31 from input buffer 34 and shift that subtile row into rotate array 40, and then add a negative offset to the input buffer address to retrieve the next subtile row SR30. The process repeats until all the image data bits of original subtile OST have been shifted into rotate array 40. Image data bits of each subtile row SR are parallel-shifted into rotate array 40 in a similar manner described above with respect to FIG. 8A. Accordingly, after all image data bits of original subtile OST are shifted into rotate array 40, image data bits from the bottom subtile row SR31 which are first shifted into rotate array 40 end up along top array row AR00, and image data bits from the top subtile row SR00 which are last shifted into rotate array 40 end up along the bottom array row AR31. Once rotate array 40 is full, the same operations involving the shifting of image data bits out of rotate array 40 described above with respect to FIG. 8A are performed such that the first output word 100-1 forming image data bits that are first shifted out of rotate array 40 (i.e., image data bits originally occupying the leftmost array column) form the top row R00 of rotated subtile RST, and the last output word 100-32 forming image data bits that are last shifted out of rotate array 40 (i.e., image data bits originally occupying the rightmost array column) form the bottom row R31 of rotated subtile RST.

Figure 8D:
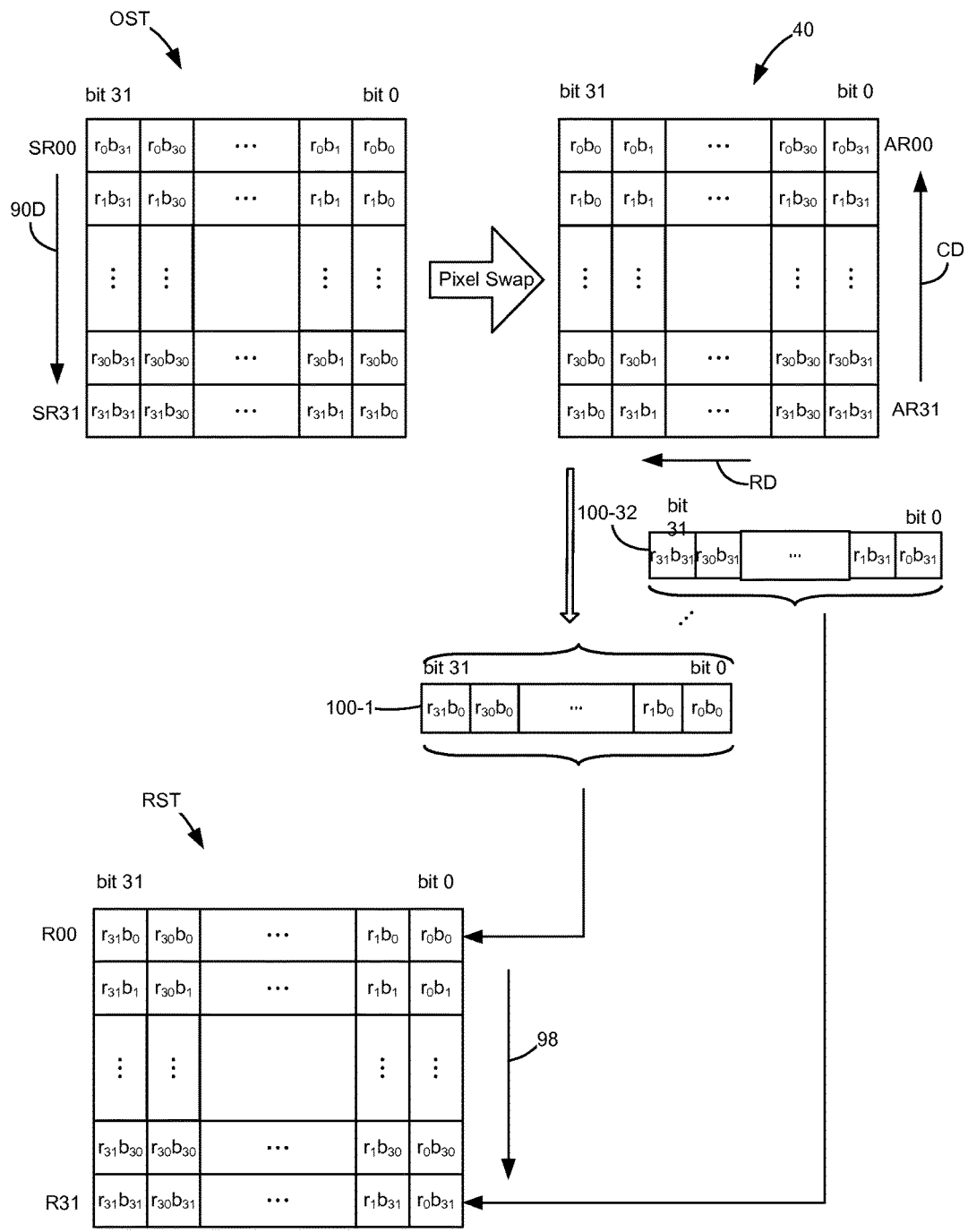
FIG. 8D is a diagram illustrating shifting of image data bits into and out of the rotate array when a 90° rotate operation with horizontal mirroring is performed in a 1 bpp case, according to an example embodiment.

FIG. 8D illustrates an example embodiment in which image data bits from the original subtile OST are shifted into and out of rotate array 40 when a 90° rotate operation with horizontal mirroring is performed for a 1 bpp case. In this example embodiment, subtile rows SR of the original subtile OST are read out of input buffer 34, pixel-swapped, and loaded into rotate array 40 starting from the top subtile row SR00 to the bottom subtile row SR31, as indicated by the subtile row read direction 90D. Accordingly, image data bits of the top subtile row SR00 are shifted first into rotate array 40 and image data bits of the bottom subtile row SR31 are shifted last into rotate array 40. Control logic 43 may determine a starting address in input buffer 34 corresponding to the top subtile row SR00 of the original subtile OST, read the top subtile row SR00 from input buffer 34 and shift that subtile row into rotate array 40, and then add a positive offset to the input buffer address to retrieve the next subtile row SR01. The process is repeated until all the image data bits of original subtile OST have been shifted into rotate array 40. Image data bits of each pixel-swapped subtile row PSR are parallel-shifted into rotate array 40 in a similar manner described above with respect to FIG. 8A. Accordingly, after all image data bits of original subtile OST are shifted into rotate array 40, image data bits from the top subtile row SR00 which are first shifted into rotate array 40 end up along top array row AR00 with a reversed bit pattern, and image data bits from the bottom subtile row SR31 which are last shifted into rotate array 40 end up along the bottom array row AR31 with a reversed bit pattern. Once rotate array 40 is full, the same operations involving the shifting of image data bits out of rotate array 40 described above with respect to FIG. 8A are performed such that the first output word 100-1 forming image data bits that are first shifted out of rotate array 40 (i.e., image data bits originally occupying the leftmost array column) form the top row R00 of rotated subtile RST, and the last output word 100-32 forming image data bits that are last shifted out of rotate array 40 (i.e., image data bits originally occupying the rightmost array column) form the bottom row R31 of rotated subtile RST.

Figure 10:
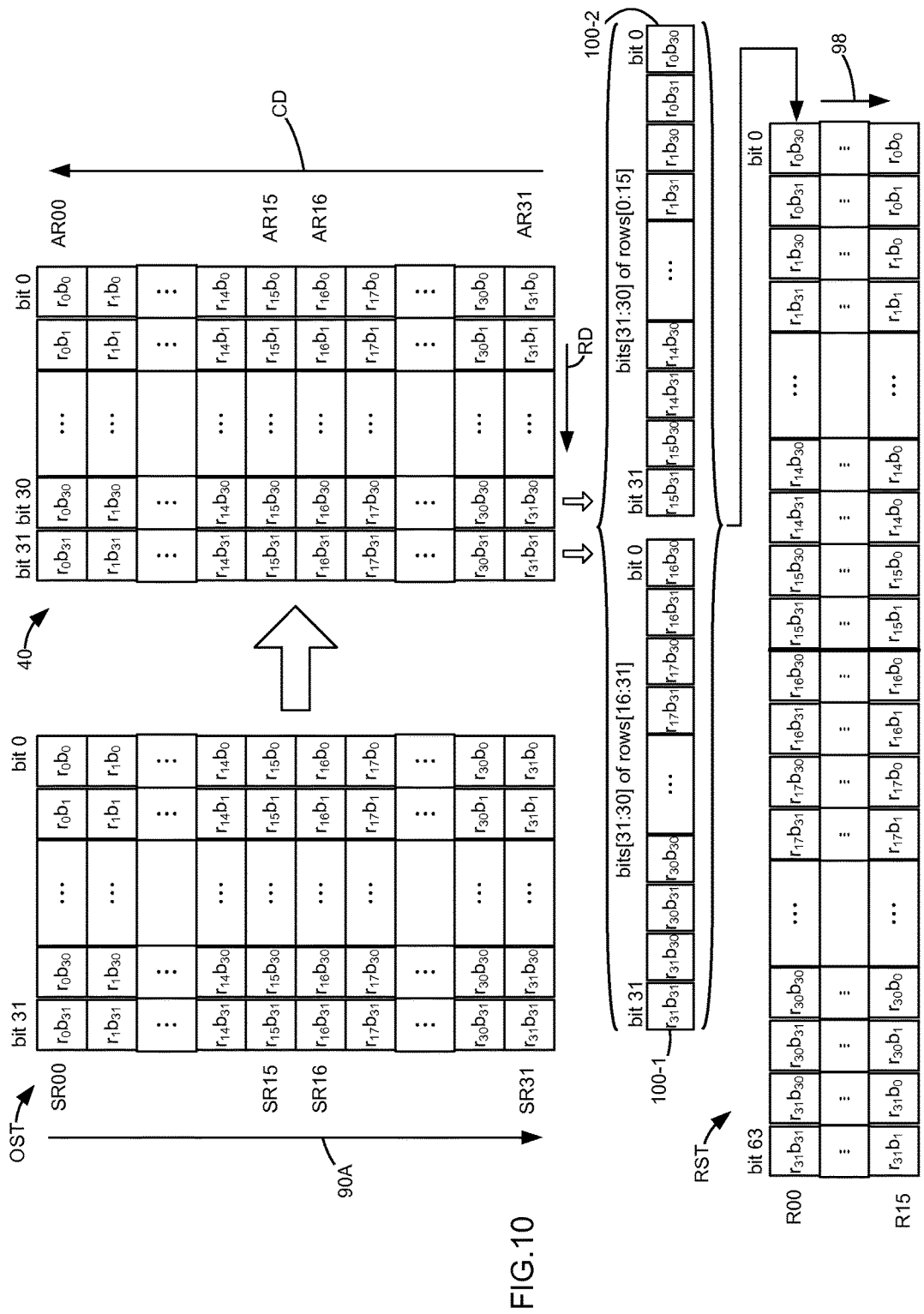
FIG. 10 is a diagram illustrating shifting of image data bits into and out of the rotate array when a 90° rotate operation without mirroring is performed in a 2 bpp case, according to an example embodiment.

FIG. 10 illustrates an example embodiment in which image data bits from the original subtile OST are shifted into and out of rotate array 40 when a 90° rotation without mirroring is performed for a 2 bits-per-pixel case. Image data bits in original subtile OST are shifted into rotate array 40 using the same process described above with respect to performing a 90° rotation without mirroring for the 1 bpp case (FIG. 8A). That is, image data bits of each subtile row SR are parallel-shifted into rotate array 40 as subtile rows are sequentially read out of input buffer 34 starting from the top subtile row SR00 to the bottom subtile row SR31 according to the subtile row read direction 90A. Thus, image data bits from the top original subtile row SR00 end up along top array row AR00 and image data bits from the bottom original subtile row SR31 end up along the bottom array row AR31.

Once rotate array 40 is full, the image data bits therein are repeatedly shifted by a shift amount in the row direction RD to shift the image data bits out of rotate array 40. In this example, because each pixel is two bits, the shift amount corresponds to two bit positions such that each image data bit in rotate array 40 is shifted by two bit position along row direction RD during a shifting operation. For each shifting operation, image data bits occupying the bit 31 and bit 30 positions of each array row AR (thus, a total of 64 image data bits) are shifted out of rotate array 40 and used to form a subtile row of rotated subtile RST. In the example shown, the thirty-two image data bits that are shifted out from the bottom half array rows AR16-AR31 are combined to form a first output word 100-1, with the image data bits $r_{16}b_{31}$, $r_{16}b_{30}$ which form the leftmost pixel in array row AR16 shifted out therefrom occupying the bit 1 and bit 0 positions of the output word 100-1, respectively, and the image data bits $r_{31}b_{31}$, $r_{31}b_{30}$ which form the leftmost pixel in array row AR31 shifted out therefrom occupying the bit 31 and bit 30 positions of the output word 100-1, respectively. Meanwhile, the thirty-two image data bits that are shifted out from the upper half array rows AR00-AR15 are combined to form a second output word 100-2, with the image data bits $r_0b_{31}$, $r_0b_{30}$ which form the leftmost pixel in array row AR00 shifted out therefrom occupying the bit 1 and bit 0 positions of the output word 100-2, respectively, and the image data bits $r_{15}b_{31}$, $r_{15}b_{30}$ which form the leftmost pixel in array row AR15 shifted out therefrom occupying the bit 31 and bit 30 positions of the output word 100-2, respectively. The same method of combining image data bits to form a subtile row of rotated subtile RST is performed after image data bits are shifted out of rotate array 40 in each subsequent shifting operation. In this example, the shifting operation is repeatedly performed 16 times in order to shift all image data bits out of rotate array 40, thereby creating sixteen subtile rows R00-R15 of rotated subtile RST with each subtile row including two 32-bit output words or sixty-four image data bits.

The same concepts described above can be applied for other bit depths. For each type of mirroring and/or rotation operation discussed above, image data bits of the original subtile OST are shifted into rotate array 40 in the same fashion regardless of bit depth, but the output shifting of image data bits out of rotate array 40 and the manner in which outputted image data bits are combined to form output words and used to form subtiles rows of rotated subtile RST may vary depending on bit depth. For higher bit depths, more bits from each array row are combined to create output words which form a subtile row of the rotated subtile RST before rotate array 40 is again left-shifted. Table 1 illustrates example parameters for different bit depths.

TABLE 1

| Bit Depth | 1 bpp | 2 bpp | 4 bpp | 8 bpp |
|---|---|---|---|---|
| shift amount/bits shifted out per array row per shifting operation | 1 | 2 | 4 | 8 |
| number of bits shifted out of rotate array per shifting operation | 32 | 64 | 128 | 256 |
| number of shifting operations performed to shift all image data bits out of rotate array | 32 | 16 | 8 | 4 |
| dimensions of rotated subtile (bits wide × rows tall) | 32 × 32 | 64 × 16 | 128 × 8 | 256 × 4 |

In other alternative example embodiments, rotate array 40 may be configured to be capable of shifting-in image data bits in two directions (i.e., from the top or the bottom along the column direction), and to be capable of shifting-out image data bits in two directions (i.e., to the left or to the right along the row direction). In this example, a mirrored and/or rotated image may be achieved by reversing the direction of shifting of image data bits into and out of rotate array 40 instead of performing pixel swapping and applying a negative offset to step through subtile rows in the input buffer 34. This approach may require additional multiplexer inputs to allow shifting of image data bits in other directions. For example, multiplexers 53 of rotate array 40 in FIG. 3 may need additional inputs to accommodate shifting of image data bits downward opposite the column direction CD and shifting of image data bits to the right opposite the row direction RD.

The above example embodiments combine simple operations to perform rotation and mirroring. More particularly, different combinations of mirroring and orthogonal rotation can be achieved by using the 90° rotate functionality of rotate array 40 in concert with a subtile processing order 85, a subtile row read direction 90, and pixel swapping. The combination of these simple functions advantageously results in a lower logic gate count. Additionally, higher throughput can be achieved since no additional clocks are required to perform mirroring and/or rotation as they are performed while bits are shifted into and out of rotate array in an appropriate order. For instance, in the above examples, each 32-bit by 32-line subtile in the tile may require 64 clocks to rotate (i.e., 32 clocks for shifting subtile rows into the rotate array and 32 clocks for shifting bits out of the rotate array). Since there are sixty-four subtiles in the tile, it may take only 4096 clocks in order for rotate block 28 to rotate and/or mirror the tile.

It will be appreciated that the actions described and shown in the example embodiments may be carried out or performed in any suitable order. It will also be appreciated that not all of the actions described herein need to be performed in accordance with the example embodiments of the disclosure and/or additional actions may be performed in accordance with other embodiments of the disclosure.

The foregoing description of several example embodiments of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A system, comprising: a rotate block including an array of elements arranged in subtile rows by subtile columns including bit storage units for storing image data bits of a subtile of an image to be rotated, wherein the rotate block is operative to load the image data bits of each subtile row of the subtile into the array according to a subtile row load direction that is selected from a plurality of load directions based at least upon a rotate operation to be performed on the image, and repeatedly unload image data bits out of the array in only one direction transverse to the load directions to produce a rotated subtile, the image data bits that are unloaded from the array from each unloading operation forming a subtile row of the rotated subtile, each of said elements in a same subtile row above a bottommost subtile row include as input an output of one of said elements in a same subtile column of a one-prior subtile row.

2. The system of claim 1, wherein said each of said elements includes a multiplexer, an output of the multiplexer providing an input to the bit storage units of the array, inputs to multiplexers in said same subtile row include 1) said output of said one of said elements in said same subtile column of said one-prior subtile row and 2) outputs from the bit storage units of prior columns in the same row.

* * * * *